Figure 1:
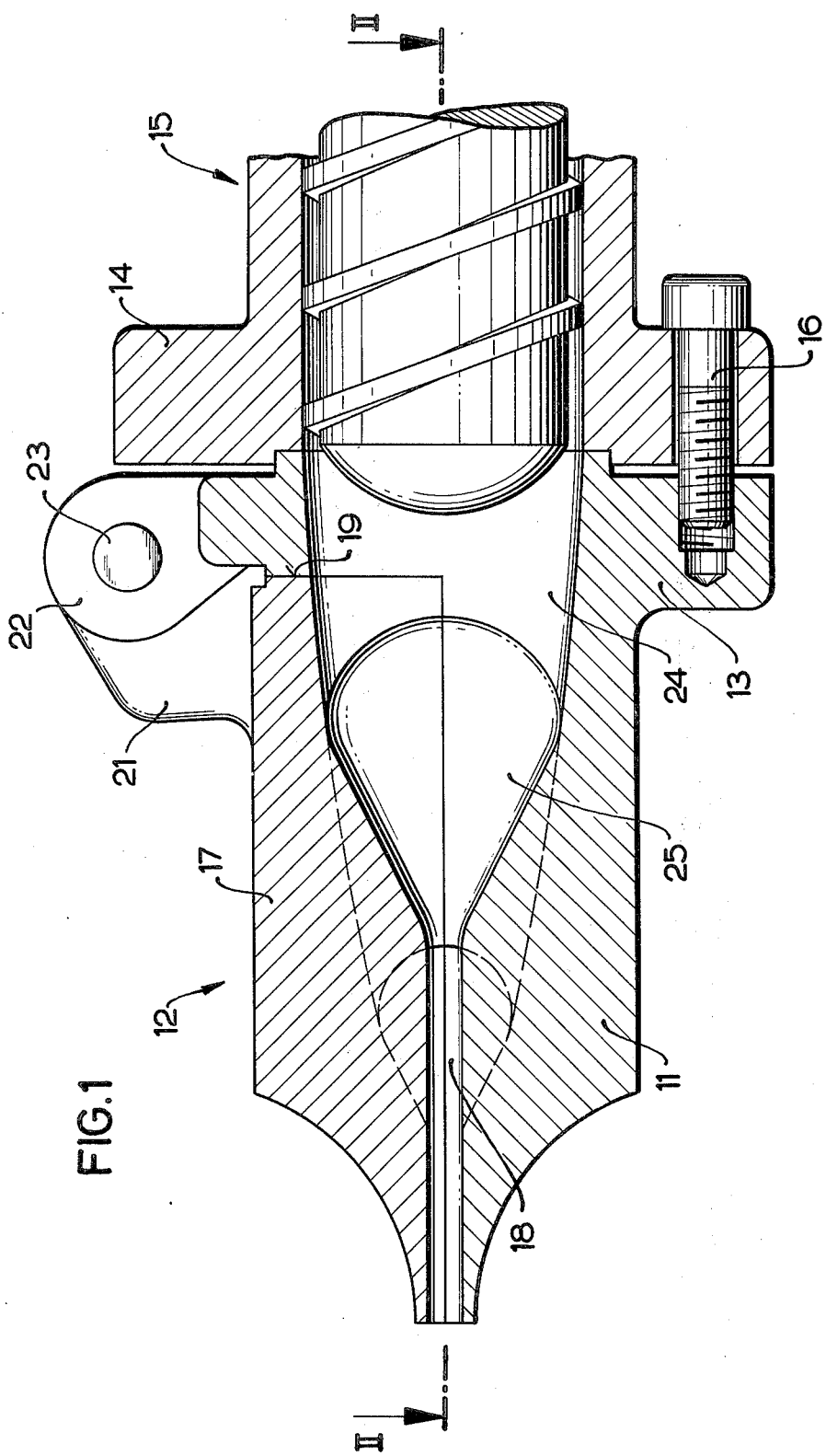

United States Patent [19]
Anders et al.

[11] 3,988,097
[45] Oct. 26, 1976

[54] EXTRUDER SLOT DIE HEAD

[75] Inventors: Dietmar Anders, Hannover-Kleefeld; Gerd Capelle, Krahenwinkel, both of Germany

[73] Assignee: Hermann Berstorff Maschinenbau GmbH, Hannover-Kleefeld, Germany

[22] Filed: Mar. 17, 1975

[21] Appl. No.: 559,061

[30] Foreign Application Priority Data
Mar. 22, 1974  Germany............................ 2413844

[52] U.S. Cl............................. 425/192 R; 425/225; 425/376; 425/461
[51] Int. Cl.²........................................... B29F 3/00
[58] Field of Search ............ 425/190, 191, 192, 225, 425/226, 227, 229, 230, 231, 461, DIG. 51, 188, 376; 264/176 R

[56] References Cited
UNITED STATES PATENTS

| | | | |
|---|---|---|---|
| 2,239,408 | 4/1941 | Wallace | 425/227 X |
| 2,918,714 | 12/1959 | Garvey | 425/188 |
| 2,979,768 | 4/1961 | Nichols | 425/227 |
| 3,183,552 | 5/1965 | Farkas | 425/DIG. 51 |
| 3,393,426 | 7/1968 | Meienberg | 425/192 X |
| 3,902,835 | 9/1975 | Theysohn | 425/192 X |

Primary Examiner—Francis S. Husar
Assistant Examiner—Mark Rosenbaum
Attorney, Agent, or Firm—Donald D. Jeffery

[57] ABSTRACT

Ejecting means, in a slot die head to extrude plastic material in a strip, whereby material left in the slot die head after extrusion has ceased can be removed, comprising a piston mounted with its crown flush with the inner wall of a distributing passage in the slot die head, so that, after the slot die head has been opened by separately upper and lower parts thereof, the piston can be moved hydraulically to project into the distributing passage to lift the residual material away from the wall of the distributing passage containing the piston to facilitate grasping of the material by an operator and stripping from the slot die head.

4 Claims, 3 Drawing Figures

EXTRUDER SLOT DIE HEAD

The invention relates to a slot die head comprising separable upper and lower parts, for extruders which process plastic materials, especially rubber, and wherein material to be extruded is distributed over the internal width of the die by means of a distributing passage which preferably has a fish-tail outline.

In such a slot die head the extruder plasticises the material to be processed and conveys it, when it has been prepared appropriately to the material, into the slot die head. Here the material, which is under conveying pressure, is distributed across the width of the die by virtue of the fish-tail shaped distributing passage, before being extruded in the form of a broad strip. The strip may for example then be fed to a downstream two-roll calender which calenders it to a desired thickness.

If production process is to be terminated or material of a different composition is to be processed, it is customary to stop feed of material to the extruder and to let the extruder run until it is empty. However, material is left behind in the slot die head where it cools and adheres.

In the past the residual material has usually been removed manually after the die has been opened up. The operators, who are frequently unskilled, often use hand tools such as chisel-like bars or the like to remove the tightly adhering material.

This method of cleaning out the head causes damage to the polished surface of the distributing passage, which needs to be extremely smooth and can have only the slightest rough portions if the plasticised material is to be allowed to flow properly. If the surface is not smooth obstacles to the flow of material will form and there will be places where particles of material are left behind and burnt. The unfavourable consequences, in addition to the impeded distribution of material in the head of the slot die, are the soiling of the extruded product and undesirable mechanical effects such as scoring or the like.

The above-mentioned damage to the distributing passage, caused by the conventional cleaning method, has recently proved to be a particular drawback, now that the rubber processing industry requires more slot die heads of large widths. With these larger heads a good flow of material, in order to achieve even distribution across the larger working width, is even more important than it was for heads with smaller working widths.

In addition the even distribution of pressure over larger working widths can far more easily be impaired than with smaller widths.

The larger surface of the distributing passage with larger working widths necessarily greatly increases the risk of damage when the heads of the slot dies are being cleaned. Moreover the residual material, which in the case of many materials holds together in one piece over the entire length of the distributing passage, sets up strong resistance to removal, which requires strength and time on the part of the operator.

According to the invention there is provided an extruder slot die head for an extruder to process plastic materials and in which material to be extruded is distributed over the width of the die by means of a distributing passage, the slot die head having separable upper and lower parts and at least one ejecting piston arranged displaceably in one or the other or both of the upper and lower parts in the region of the distributing passage and means whereby the piston can be impinged on to move its crown out of the surface of the distributing passage.

Such a slot die head can relatively easily be cleaned of residual material without significant risk of damage thereto.

Thus, to clean the slot die head, the two parts are separated and force is applied to the ejecting piston to move the crown of the piston out of the surface of the distributing passage. The residual material, which holds together in large pieces or even in a single piece, is thus pressed or lifted away from the surface of the distributing passage and can easily be grasped and pulled completely out of the slot die head.

It is thus no longer necessary to prise the material away from the surface of the distributing passage with a chisel-like hand tool.

It is an advantage for the ejecting piston or pistons in the distributing passage to be positioned opposite to the end of the slot die head from which material is extruded in operation and preferably for the piston or pistons to be inclined in the conveying direction. In the case of materials such as rubber which holds together strongly, this has the advantageous effect of enabling the residual material to be pulled out of the feed passage too.

Advantageously, force is applied to the ejecting piston or pistons hydraulically. This has the advantage that they can be connected to the pressure supply which is normally provided to supply hydraulically operated piston-cylinder arrangements for keeping the two parts of the slot die head in abutment during extrusion and for separating them for cleaning. Apart from a simple valve control no additional units as necessary.

Figure 2:
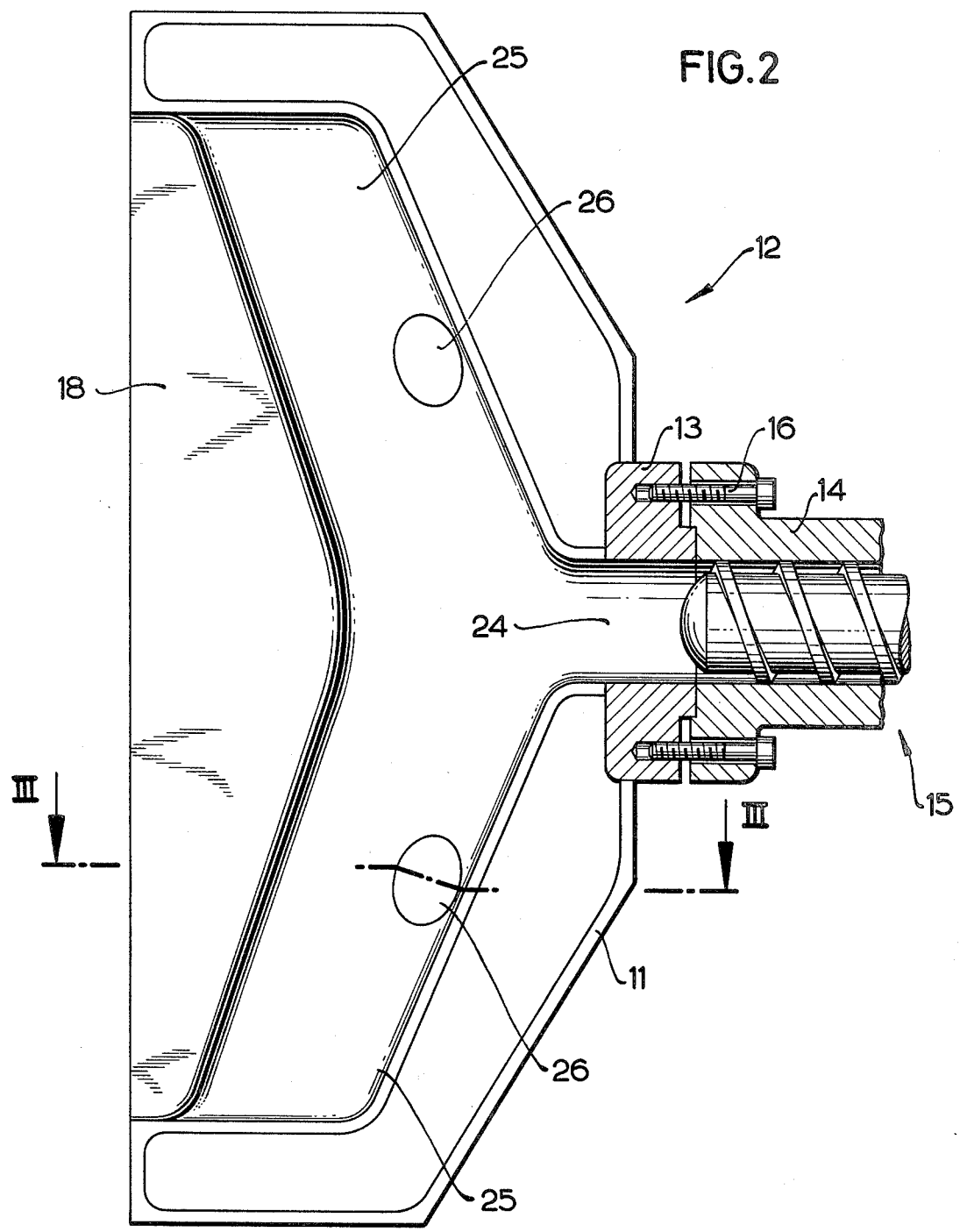
Figure 3:
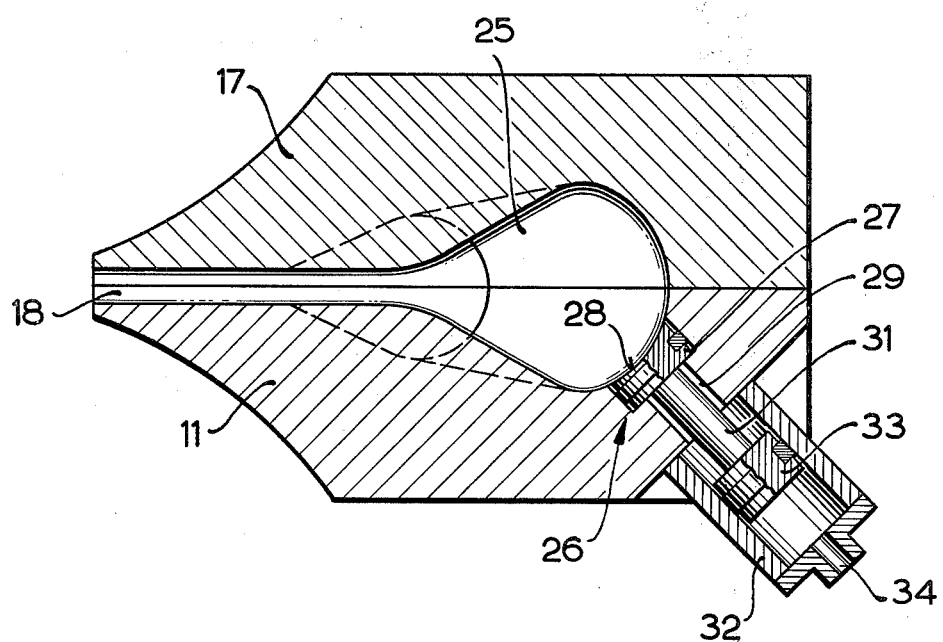

The invention is diagrammatically illustrated by way of example in the accompanying drawings. For clarity, inessential, known auxilliary devices and their associated pipes have been omitted. In the drawings:

FIG. 1 is a sectional side elevation of a two-part slot die head according to the invention to be mounted at the output end of a screw extruder, FIG. 2 is a sectional plan view taken on Line II—II of FIG. 1, and FIG. 3 is a sectional elevation taken on Line III—III of FIG. 2.

Referring to the drawings, a lower part 11 of a two-part head 12 of a slot die has a flange 13, containing a hole, at its rear end. It is attached by the flange 13 to a flange 14 of the cylinder of a screw extruder 15 by screws 16. An upper part 17 of the head 12 rests on the lower part 11 and against the upper half of the end flange 13, with a joint line indicated at 19, forming an extrusion orifice 18. The upper part 17 has a hinge member 21 cast integral therewith. A hinge pin 23, located in a hinge member 22 cast integral with the end flange 13, passes through the hinge members 21 and 22. The head 12 can be opened up by swinging the upper part 17 upwardly about the axis of the hinge pin 23.

In the closed position (FIGS. 1 and 3) the upper and lower parts 17 and 11, with the aid of appropriate recesses, form a feed passage 24 and, adjoining the feed passage, a fish-tail shaped distributing passage 25, through which the extrusion orifice 18 is evenly charged across its entire working width.

In the lower part 11, in each branch of the distributing passage 25, an ejecting piston 26 is arranged at the end opposite to the extruding end of the head 12 with its central axis inclined to the conveying plane (FIG. 2). In the retracted position illustrated (FIG. 3) the crown 28 of the ejecting portion 27 of the piston 26 conforms to the surface shape of the distributing passage 25.

The ejecting portion 27 is connected, by a pressing rod 31 extending through a through-hole 29 in the lower part 11, to a piston member 33 which is guided in a pressure medium cylinder 32 and impinged on by pressure. The cylinder 32 may be connected to a pressure source (not shown) by way of a short piece of pipe 34.

In the operating state the upper and lower parts may be held together in the position shown in FIGS. 1 and 3 by a hydraulic locking device which is known per se but not illustrated here.

In a roller head installation it is known for the lower part of the head to be fixed between the calender stands of a two-roll calender which is provided after the extruder in the extruding direction.

The arrangement according to the invention operates as follows.

In operation the screw of the extruder 15 conveys plasticised material into the feed passage 24 of the head 12. The plasticised material, which is under conveying pressure, is distributed evenly over the entire working width by virtue of the distributing passage 25, is extruded through the slit orifice 18 and is fed, for example, to a gap between the rolls of a two-roll calender.

When a production process is over, the screw cylinder of the extruder runs empty. There is no conveying pressure, so hardening material is left in the feed passage 24 and the distributing passage 25 and sticks to the surface of these passages.

In order to empty and/or clean the head the upper part 17 is swung upwardly about the hinge pin 23 away from the lower part 11 after the upper and lower parts have been unlocked from one another. The head 12 is thus opened up. The pressure medium cylinder 32 is then connected to a pressure source, advantageously the source which also supplied the pressure-operated locking device and hydraulic opening cylinders, and acts on the piston member 33. The crown 28 of the ejecting portion 27 is thus moved out of the surface of the passage 25 and lifts the material off that surface. Now the operator can easily take hold of the remaining material and strip it out of the head.

A plurality of ejecting pistons 26 can obviously be provided if desired in each branch of the distributing passage 25 and if desired the ejecting pistons could alternatively or in addition be provided in the distributing passage of the upper part 17.

What is claimed is:

1. In an extruder to process plastic materials, a slot die head formed by co-operating upper and lower parts, said upper and lower parts being separable and having inner walls defining a distributing passage, whereby material fed under pressure to said slot die head can be distributed over the width of said distributing passage, said upper and lower parts also defining an outlet slot through which the extruded material can be discharged from said slot die head, and an ejecting piston arranged displaceably in said slot die head, said piston having a crown disposed in a normal position of said piston flush with one of said inner walls of said upper and lower parts which define said distributing passage, and means projecting said piston from said flush position with one of said inner walls into said distributing passage, whereby the material is lifted off the surface of said distributing passage to enhance removal of the material.

2. The invention claimed in claim 1, wherein said ejecting piston is positioned at the end of said slot die head opposite to an end thereof at which said outlet slot is provided and is inclined relative to the direction of extrusion.

3. The invention claimed in claim 1, wherein a plurality of ejecting pistons are provided in said slot die head.

4. The invention according to claim 1, wherein said means for projecting said piston comprises hydraulic means including a second piston operatively connected to said ejecting piston, said second piston being subjected to hydraulic pressure for moving said ejecting piston into said distributing passage.

* * * * *